(12) United States Patent
Iden

(10) Patent No.: US 9,038,280 B2
(45) Date of Patent: May 26, 2015

(54) MIRRORED COMPASS WITH IMPROVED SIGHTING WINDOW

(75) Inventor: Marlin Iden, Riverton, WY (US)

(73) Assignee: FENIX OUTDOOR AB, Ornskoldsvik (SE)

( * ) Notice: Subject to any disclaimer, the term of this patent is extended or adjusted under 35 U.S.C. 154(b) by 844 days.

(21) Appl. No.: 13/181,879

(22) Filed: Jul. 13, 2011

(65) Prior Publication Data

US 2013/0014397 A1    Jan. 17, 2013

(51) Int. Cl.
*G01C 17/20*        (2006.01)
(52) U.S. Cl.
CPC ..................... *G01C 17/20* (2013.01)
(58) Field of Classification Search
CPC ........ G01C 17/00; G01C 17/02; G01C 17/04; G01C 17/06; G01C 17/08; G01C 17/10; G01C 17/12; G01C 17/20
USPC .......................... 33/348, 355 R, 364; 116/304
See application file for complete search history.

(56) References Cited

U.S. PATENT DOCUMENTS

| 2,111,829 | A | * | 3/1938 | Winterer et al. | 33/272 |
| 2,358,589 | A | * | 9/1944 | Piffath | 33/364 |
| 4,438,568 | A | | 3/1984 | Kramer | |
| 6,145,209 | A | * | 11/2000 | Chang | 33/348 |
| 6,357,128 | B1 | * | 3/2002 | Iden | 33/348 |
| 6,516,526 | B1 | * | 2/2003 | Iden | 33/355 R |
| 6,739,063 | B2 | * | 5/2004 | Chang | 33/355 R |
| 8,695,225 | B2 | * | 4/2014 | Iden | 33/355 R |
| 2004/0045179 | A1 | * | 3/2004 | Chang | 33/355 R |

OTHER PUBLICATIONS

Extended Search Report issued in the corresponding European Patent Application No. 12154593.3 issued on Apr. 4. 2014.

* cited by examiner

*Primary Examiner* — R. A. Smith
(74) *Attorney, Agent, or Firm* — Nixon & Vanderhye PC

(57) ABSTRACT

A recreational or outdoor mirrored compass is comprised of a base member, a hinged cover with a mirror and a sighting window for sighting a land mark, and a vial assembly pivotally coupled to said base member. The vial assembly comprises a vial, a magnetized indicator member pivotally journaled in the vial and an azimuth ring. At least parts of the inner sides of the sighting window are tapered in the line of sight.

20 Claims, 5 Drawing Sheets

MIRRORED COMPASS WITH IMPROVED SIGHTING WINDOW

FIELD OF THE INVENTION

The present invention relates to an outdoor or recreational compass, more particularly to a hand-held mirrored compass for orienteering.

BACKGROUND OF THE INVENTION

Compasses of various kinds are known in the state of the art and are used for orienteering, i.e. the practice of using a compass, generally in combination with a topographic map, to determine a bearing or the route of travel. Commonly, classical or conventional compasses comprise a base member and a vial assembly pivotally coupled to the base member. The vial assembly comprises a vial and an azimuth ring as well as a magnetized indicator member pivotally journaled in the vial. Generally, the magnetized indicator member is a needle pointing to magnetic north. Moreover, an orienting marker is located in the vial. Commonly, the orienting marker is in form of an orienting arrow.

For taking a bearing for a destination visually, the compass is held level with a direction-to-travel arrow pointing towards the desired destination. For instance, the latter one can be a land mark like a mountain, a hill or a building. However, accurate sighting of a land mark and simultaneously taking a bearing is demanding and can lead to errors. To overcome such problems, the compass can be equipped with a hinged cover comprising a mirror and a sighting window or alternatively with a back sight. Such compasses are commonly called mirrored compasses. This allows sighting the land mark through the sighting window and simultaneously allows reading the needle alignment and azimuth ring in the reflection of the mirror.

Although usage of a mirrored compass greatly facilitates the sighting of a land mark and, hence, the handling of the compass, the sighting is still prone to inaccuracies caused by parallax, i.e. the apparent displacement of the landmark when viewed from different line of sights. Accordingly, when the line of sight through the sighting window is not essentially straight-lined, the bearing taken may still be inaccurate. This can lead to unintended detours or even to dangerous situations when one gets lost in the wilderness.

Thus, the objective of the present invention is to provide a compass which facilitates the sighting of a land mark through the sighting window.

SUMMARY OF THE INVENTION

The present invention is directed to overcoming the problems set forth above by providing a mirrored compass with a sighting window allowing for an improved bearing precision that allows an accurate and non-parallaxed line of sight to be achieved.

The inventive mirrored compass comprises a base member, a hinged cover comprising a mirror and a sighting window for sighting a land mark or the like, and a vial assembly pivotally coupled to said base member. The cover is hingewise coupled to the base member via a hinge axis. The vial assembly comprises a vial, a magnetized indicator member pivotally journaled in the vial and pointing to magnetic north, and an azimuth ring. At least parts of the inner sides of the sighting window are tapered in the line of sight. Hence, when one sees through the sighting window for sighting a land mark, the lateral faces of the inner sides of the sighting window are of equal proportion. This allows the user to recognize whether the line of sight is straight-lined or not, as the visual cognition of the shape and expansion of the lateral faces changes with the different line of sights caused by parallax.

Accordingly, the aforementioned features enable the user to verify whether the land mark is accurately sighted and positioned centrally through the sighting window. If not, the line of sight can be adjusted by either moving the compass relative to the line of sight or the head such that an accurate and non-parallaxed line of sight is achieved.

According to another aspect of the invention, the sighting window has a longish shape extending vertically from the cover hinge axis. As land marks, like trees or mountains, essentially extend in the vertical direction relative to earth's surface, a longish shape of the sighting window extending in the same direction ameliorates the accuracy of sighting.

According to another aspect of the invention, the extension of the sighting window on the back side of the cover is preferably between 10 and 20 mm in the lengthwise direction and between 3 and 5 mm in the widthwise direction. This ensures that the ratio of length to width is ideal for sighting land marks essentially extending in the vertical direction relative to earth's surface.

According to another aspect of the invention, the taper angles are in the range between 70° and 85°, and preferably are 75°. As the sighting windows narrows in the line of sight, this ensures that the lateral faces of the inner sides of the sighting window are visible to such an extent that the user is able to confidently verify the accuracy of the sighting, i.e. to avoid deviant bearings.

According to another aspect of the invention, at least two opposed inner sides of the sighting window are inversely symmetrical. This ensures that the user can verify the accuracy of sighting by solely comparing the visible lateral faces of the opposed inner sides. If the lateral sights are essentially of the same extension and shape, the user's line of sight is perfectly straight-lined and the land mark is accurately sighted.

According to another aspect of the invention, at least two opposed inner sight of the sighting window are of different contrasting colors. This further helps to avoid parallax as the user can distinguish the inner sides by its colors and the visible colored area.

According to another aspect of the invention, the inner sides of the sighting window at least partially protrude from the cover in direction inverse to the line of sight. Hence, an ample extension of the inner sides is provided such that the user can easily verify his accurate line of sight.

According to another aspect of the invention, the sighting window has a sighting member protruding inwardly into the sighting window. This ensures that the sighted land mark can accurately be positioned in the middle of the sighting window.

According to another aspect of the invention, the sighting member has a triangular shape. When the tip of the sighting member points to the land mark, the land mark is centered in the sighting window.

According to another aspect of the invention, the sighting member is arranged at the inner side of the sighting window being farthest from the cover hinge axis. Thus, when the sighted land mark is positioned underneath the sighting member, the land mark is essentially centered and in the sighting window. Hence, accuracy of sighting is greatly improved.

According to another aspect of the invention, the vial is transparent. This ensures that the compass can be used together with a map by placing the compass onto the map, still being able to identify the map's content, e.g. longitudinal lines.

According to another aspect of the invention, the vial is filled with a fluid, preferably with a damping fluid. The fluid dampens the spinning action of the needle. Hence, shivering of the needle is avoided resulting in a quicker and more accurate readability of the bearing.

The foregoing is given more for the purpose of illustration and not limitation with respect to different features of the compass.

The above and other objects, advantages and features of the present invention will become more readily appreciated and understood from consideration of the following detailed description of a preferred embodiment of the present invention when taken together with the accompanying drawings.

DETAILED DESCRIPTION OF THE DRAWINGS

Figure 1:
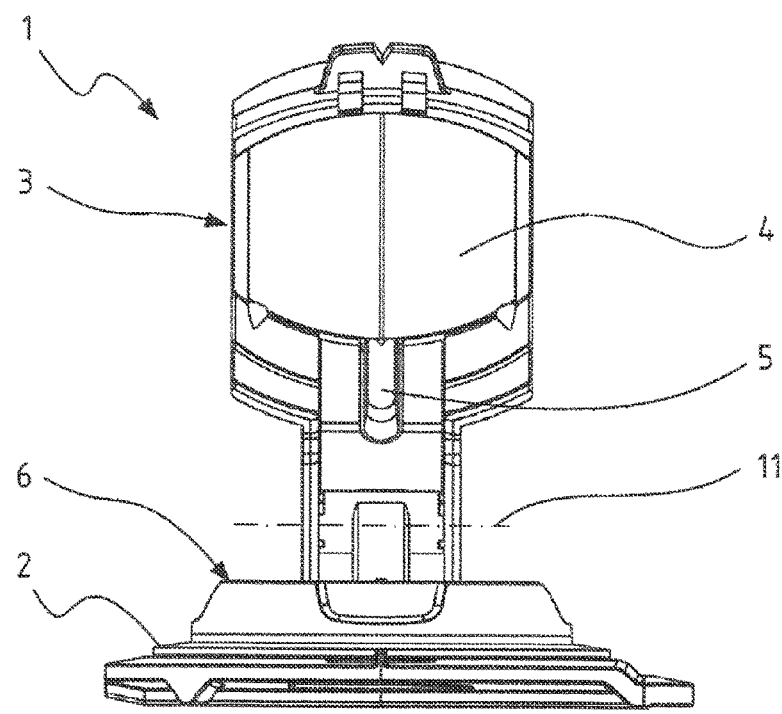
FIG. 1 is a straight on view of the preferred embodiment of the invention.
Figure 2:
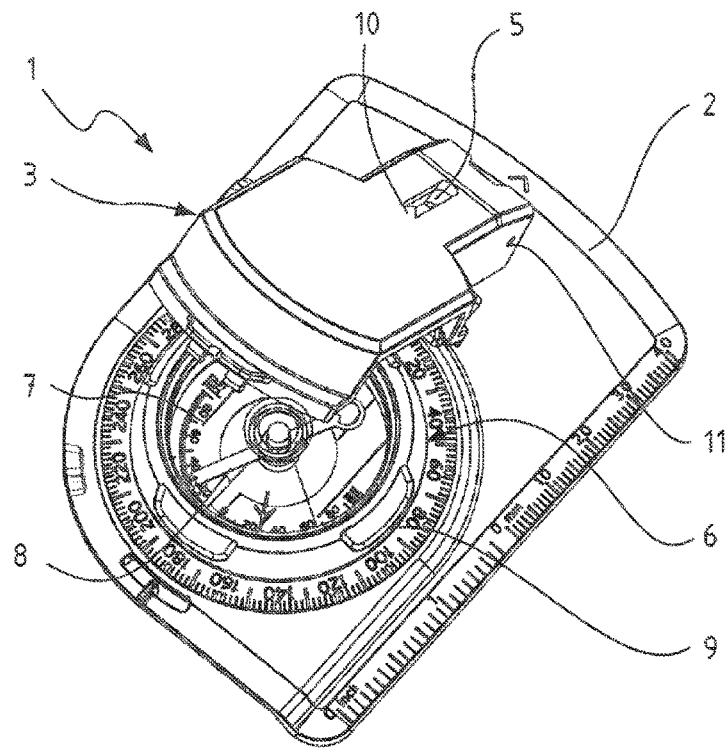
FIG. 2 is a perspective top view of the compass of FIG. 1.
Figure 3:
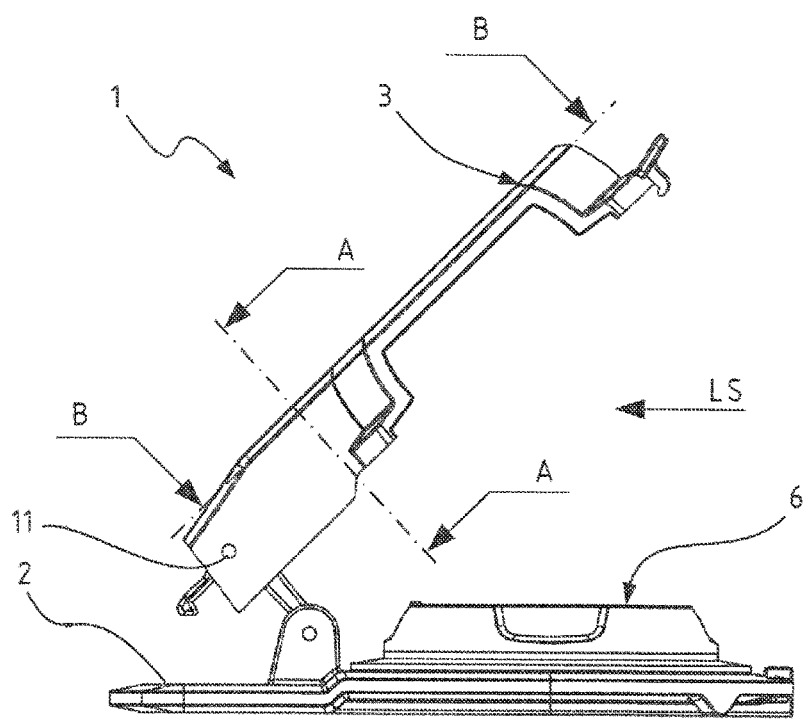
FIG. 3 is lateral view of the compass of FIG. 1.

A compass 1 is illustrated in FIGS. 1 to 3 broadly comprise of a transparent base member 2 being made of a transparent plastic material, a cover 3 hingewise coupled to the base member 2 and a vial assembly 6 pivotally mounted to the base member 2. The base member 2 has a ruler on one side.

As best seen in FIG. 1, the cover 3 is indirectly coupled to the base member 2 via a hinge axis 11 and comprises of a mirror 4 located on the inner side of the cover 3, i.e. that side of the cover 3 facing the vial assembly 6. Moreover, the cover 3 comprises of a sighting window 5 positioned underneath the mirror 4 in direction to the hinge axis 11. A detailed description of the shape and extensions of the sighting window 5 will be given below.

As illustrated in FIG. 2, the vial assembly 6 comprises of a vial 7 filled with a dampening fluid, a magnetized needle 8 having a north end and a south end and an azimuth ring 9. The azimuth ring 9 has a degree scale covering 0°, to 360°, in 2°-steps.

When using the mirrored compass 1 for sighting for a land mark, the cover 3 is angularly positioned relative to the base member 3 such that the vial assembly 6 is mirrored in the mirror 4. As shown in FIG. 2, the cover 3 is preferably positioned in an angle of about 45°, relative to the base member 2, such that the line of sight LS of the user (as indicated by the arrow) allows to sight the land mark through the sighting window 5 and simultaneously to regard the reflection of the vial assembly 6, i.e. of the vial 7, the needle 8 and the azimuth ring 9 in the mirror 4.

As can be seen in FIG. 3, the cover 3 can be coupled to the base member 2 with a hinge member having a second hinge axis. This allows for more flexibility regarding the positioning of the cover 3 relative to the base member 2.

Figure 4:
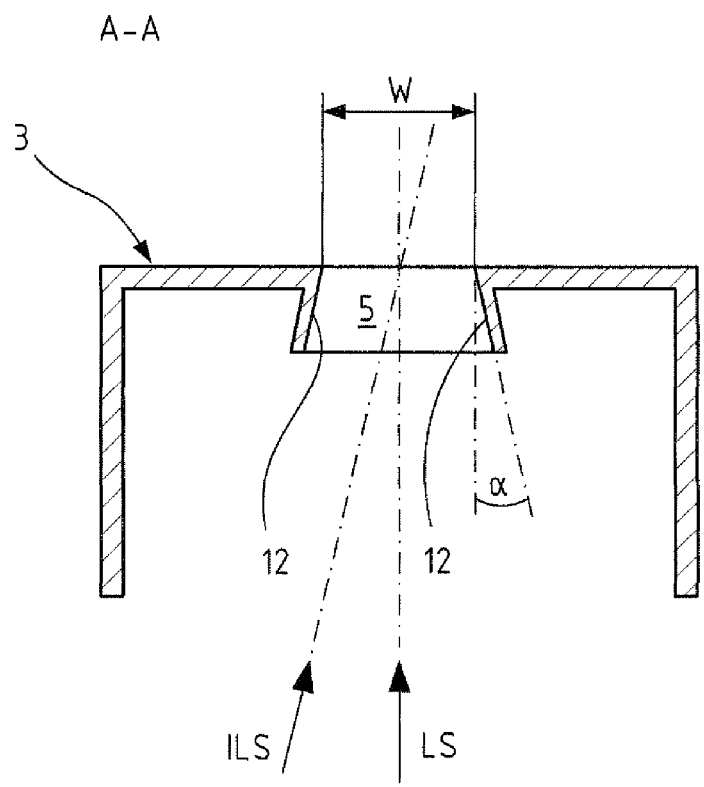
FIG. 4 is a cross sectional view of the compass of FIG. 3 along line A-A
Figure 5:
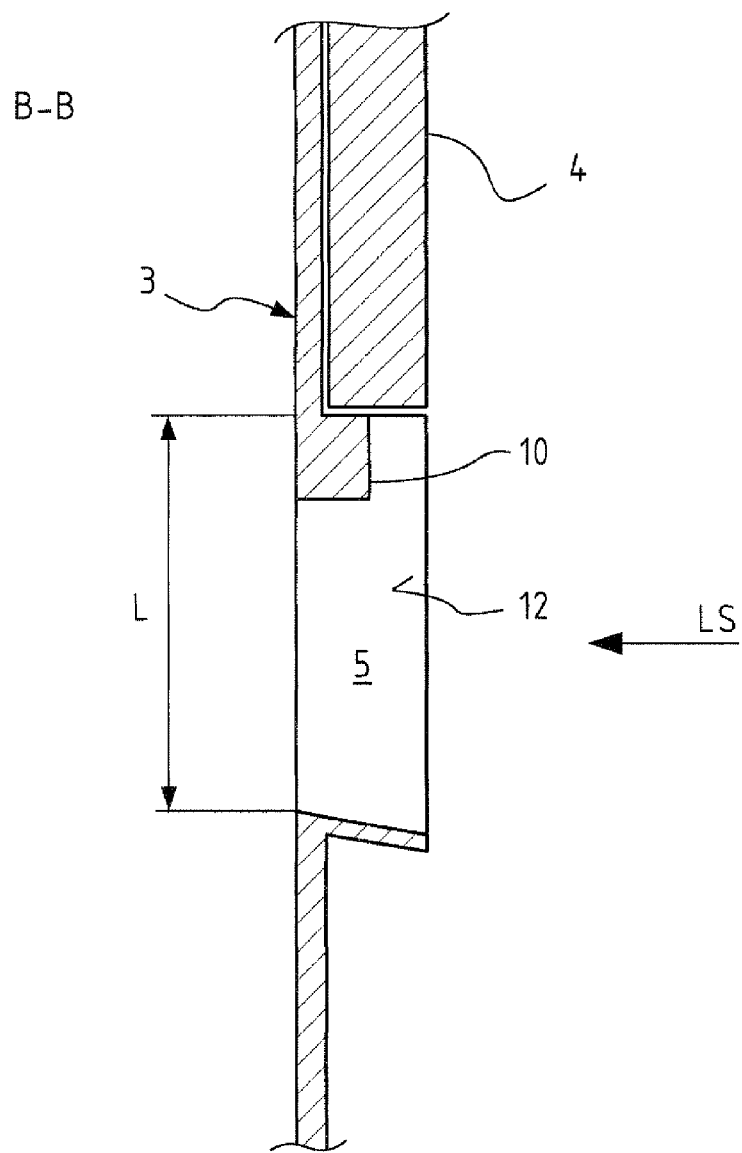
FIG. 5 is a cross sectional view of the compass of FIG. 3 along line B-B.

The sighting window 5 is illustrated in FIG. 4 and FIG. 5 as a schematic cross sectional view along the lines A-A and B-B respectively, see FIG. 3. The sighting window 5 has tapered opposed inner sides 12 which are inversely symmetrical to each other and which protrude from the cover inversely to the line of sight LS. Accordingly, the sighting window 5 narrows in the line of sight LS, with the taper angle α being about 75°. However, other taper angles might also be reasonable, depending on the location and extension of the sighting window 5.

When the line of sight LS is straight-lined the lateral faces of the inner sides 12 appear to have the same extension. In other words, they appear to be similar, though being inverted. In contrast, when the line of sight ILS is inaccurate, either inner side 12 appears to be larger due to parallax.

Accordingly, the use can verify that the line of sight LS is accurate, when the lateral faces of the opposed inner sides 12 appear to be identical in their extension. As a further aid for the user, the opposed inner sides 12 can be of different and contrasting colors, such that the user can better rate the extensions of the lateral faces of the opposed inner sides 12.

Preferably, the width W of the sighting window 5 is between 1 mm and 5 mm and the length L of the sighting window 5 is between 10 mm and 20 mm, measured on the back side of the cover 3, see FIG. 4 and FIG. 5.

The sighting window 5 has a triangular-shaped sighting member 10 protruding inwardly into the sighting window 5, see FIG. 2 and FIG. 5. The sighting member 10 is positioned at the inner side of the sighting window 5 being farthest to the hinge axle 11 or nearest to the mirror 4, respectively. As best seen in FIG. 5, the sighting member 10 does not extend along the entire depth of the sighting window 5 as defined by the protruding inner sides 12, but is somewhat smaller. Furthermore, the inner side of the sighting window 5 positioned nearest to the hinge axis 11 and farthest to the mirror 4 has a rounded shape and is also tapered in the line of sight LS.

While a preferred embodiment of the invention is herein set forth and described, it is to be understood that various modifications and changes may be made therein including but not limited to construction and arrangement of elements as well as their composition without departing from the spirit and scope of this invention as defined by the appended claims and reasonable equivalents thereof.

REFERENCE SIGNS 1 compass
2 base member
3 cover
4 mirror
5 sighting window
6 vial assembly
7 vial
8 magnetized indicator member/needle
9 azimuth ring
10 sighting member
11 hinge axis
12 inner sides
α taper angle
L length
W width
LS line of sight
ILS inaccurate line of sight

The invention claimed is:

1. A mirrored compass comprising
   a base member;
   a cover hinged to the base member, the cover comprising a minor and a sighting window for sighting a land mark or the like; and
   a vial assembly pivotally coupled to said base member, the mirror being located on a side of the cover facing the vial assembly, the sighting window being positioned to a side of the minor, the vial assembly comprising:
    a vial;
    a magnetized indicator member journaled in the vial; and
    an azimuth ring, wherein at least parts of inner sides of the sighting window are tapered in a line of sight (LS) so that the line of sight can be adjusted at least by moving the compass relative to the line of sight so that a non-parallaxed line of sight is achieved, and wherein the cover can be angularly positioned relative to the base member, so that the vial assembly is mirrored in the minor and the line of sight LS through the sighting window allows a user to sight the land mark or the like through the sighting window and simultaneously regard the reflection of the vial, the indicator member and the azimuth ring of the vial assembly in the mirror, and wherein the sighting window has at least two opposed inner sides that are of different contrasting colors.

2. The compass of claim 1, wherein the sighting window has a longish shape extending vertically from an axis of the cover hinge.

3. The compass of claim 2, wherein an extension of the sighting window on the back side of the cover is preferably between 10 and 20 mm in a lengthwise direction (L) and between 3 and 5 mm in a widthwise direction (W).

4. The compass of claim 1, wherein the sighting window narrows in the line of sight LS, with taper angles ($\alpha$) that are in a range between 70° and 85°.

5. The compass of claim 1, wherein the sighting window has at least two opposed inner sides that are inversely symmetrical.

6. The compass of claim 5, wherein the sighting window has a sighting member that is arranged at an inner side of the sighting window that is farthest from an axis of the cover hinge.

7. The compass of claim 1, wherein the inner sides of the sighting window at least partially protrude from the cover in direction inverse to the line of sight (LS).

8. The compass of claim 1, wherein the sighting window has a sighting member protruding inwardly into the sighting window.

9. The compass of claim 1, wherein the sighting window has a sighting member that has a triangular shape.

10. The compass of claim 1, wherein the sighting window narrows in the line of sight LS with a taper angle ($\alpha$) that is 75°.

11. A mirrored compass comprising:
    a base member;
    a hinged cover comprising a minor and a sighting window for sighting a land mark or the like; and
    a vial assembly pivotally coupled to said base member, the vial assembly comprising:
        a vial;
        a magnetized indicator member journaled in the vial; and
        an azimuth ring
    wherein at least parts of inner sides of the sighting window are tapered in a line of sight (LS), and
    wherein the sighting window has at least two opposed inner sides that are of different contrasting colors.

12. The compass of claim 11, wherein the sighting window has a longish shape extending vertically from an axis of the cover hinge.

13. The compass of claim 12, wherein an extension of the sighting window on the back side of the cover is preferably between 10 and 20 mm in a lengthwise direction (L) and between 3 and 5 mm in a widthwise direction (W).

14. The compass of claim 11, wherein the sighting window narrows in the line of sight LS, with taper angles ($\alpha$) that are in a range between 70° and 85°.

15. The compass of claim 11, wherein the sighting window has at least two opposed inner sides that are inversely symmetrical.

16. The compass of claim 15, wherein the sighting window has a sighting member that is arranged at an inner side of the sighting window that is farthest from an axis of the cover hinge.

17. The compass of claim 11, wherein the inner sides of the sighting window at least partially protrude from the cover in direction inverse to the line of sight (LS).

18. The compass of claim 11, wherein the sighting window has a sighting member protruding inwardly into the sighting window.

19. The compass of claim 11, wherein the sighting window has a sighting member that has a triangular shape.

20. The compass of claim 11, wherein the sighting window narrows in the line of sight LS with a taper angle ($\alpha$) that is 75°.

* * * * *